March 27, 1934.   A. W. MUELLER   1,952,136
CUTTER FOR CHEESE CUTTERS, SLICING MACHINES, AND THE LIKE
Filed Jan. 2, 1931   2 Sheets-Sheet 1
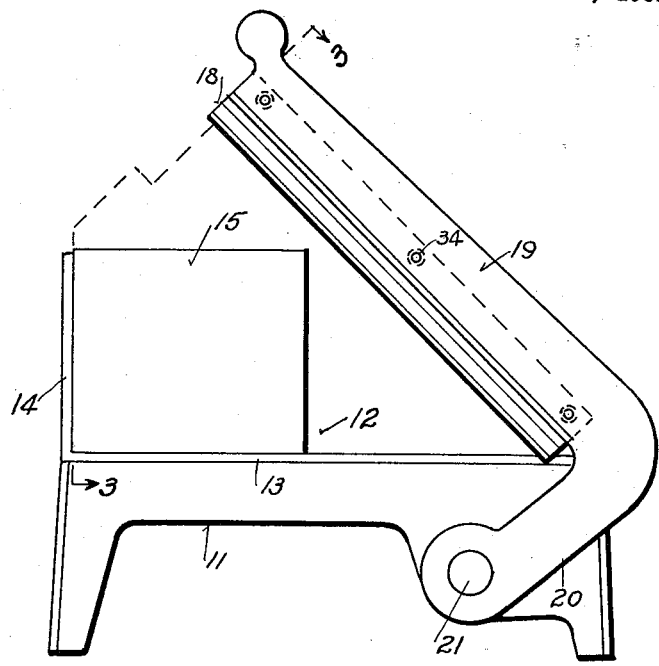
Fig. 1.
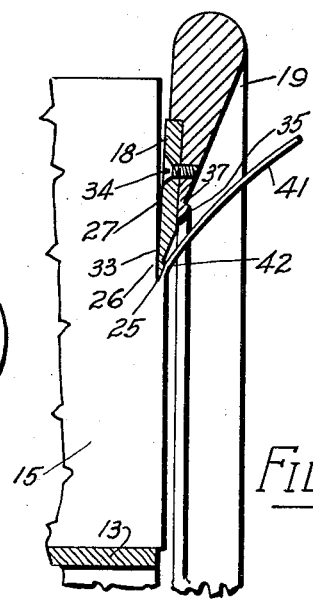
Fig. 3.
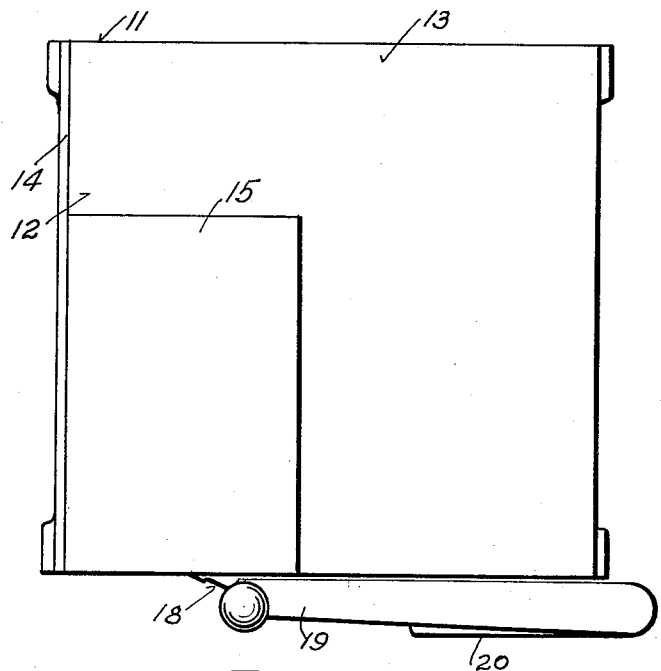
Fig. 2.
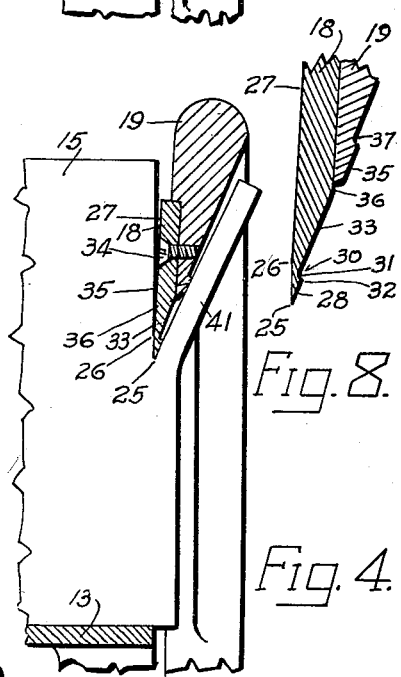
Fig. 8.
Fig. 4.
INVENTOR;
Arthur W. Mueller, Patented Mar. 27, 1934

1,952,136

UNITED STATES PATENT OFFICE 1,952,136

CUTTER FOR CHEESE CUTTERS, SLICING MACHINES, AND THE LIKE

Arthur W. Mueller, Cincinnati, Ohio

Application January 2, 1931, Serial No. 506,103

6 Claims. (Cl. 31—25)

My improved device is especially adapted for cutting cheese and similar substances, boiled ham, baked ham, sausage, and other food products capable of being sliced. My invention is described in connection with cutting cheese.

The cheese to be cut is usually in the form of so-called bricks of cheese, and my improved device is intended for use in cutting sections or slices from the bricks. Cheese of this kind is usually covered with tin foil and is usually comparatively soft and sticky, and difficulty has heretofore been experienced in the successful cutting of slices from bricks of cheese.

Such slices are usually cut very thin, as when intended for use in sandwiches and for serving in slices, the slicing being usually done by the retailer of the food.

When a wire is employed to cut the cheese there is a tendency for the cut portion of the slice to curl back upon the cut face of the brick and to stick to such face, making removal of the cut slice without breaking the slice extremely difficult or impossible, the wire also having a tendency to drag the tin foil with which the brick is covered, thus spoiling the slice.

The tendency heretofore has been, when a knife is employed for cutting, for the cut portion of the slice to hug and follow the outer face of the knife and to be dragged and crumpled by its adhesion to such outer face, and the removal of the cut slice from the knife without breaking the slice or destroying it has heretofore been difficult or impossible.

It is the object of my invention to provide a cutter of novel construction which has a cutting edge followed by a short slanting face for directing the cut portion of the slice of cheese away from the brick, this being followed by a clearance groove for clearance or release of the cut portion of the slice from the cutter for permitting passage of the cutter through the cheese and ready severance of the slice, and the deflecting and freeing of the cut portion of the slice away from the brick and the cutter.

It is the object of my invention further to provide such cutter with a ridge following the groove for aiding in directing the cut portion of the slice away from the brick, this being especially useful when cutting cheese or substances which are hard and the cut portions of the slices of which have a tendency to remain straight.

The invention will be further readily understood from the following description and claims, and from the drawings, in which latter:

Fig. 1 is an end elevation of so much of an exemplifying cutting machine embodying my invention as is necessary to illustrate the same, and showing a brick of cheese in position for being sliced.

Fig. 2 is a plan view of the same.

Fig. 3 is a longitudinal section of the same, taken on the irregular line 3—3 of Fig. 1, showing the cutter part way through a brick of soft cheese in the act of cutting a thin slice therefrom.

Fig. 4 is a similar view, showing the cutter passed part way through a brick of hard cheese, and cutting a thicker slice therefrom, and the action of the cutter upon the slice being cut.

Figure 5:
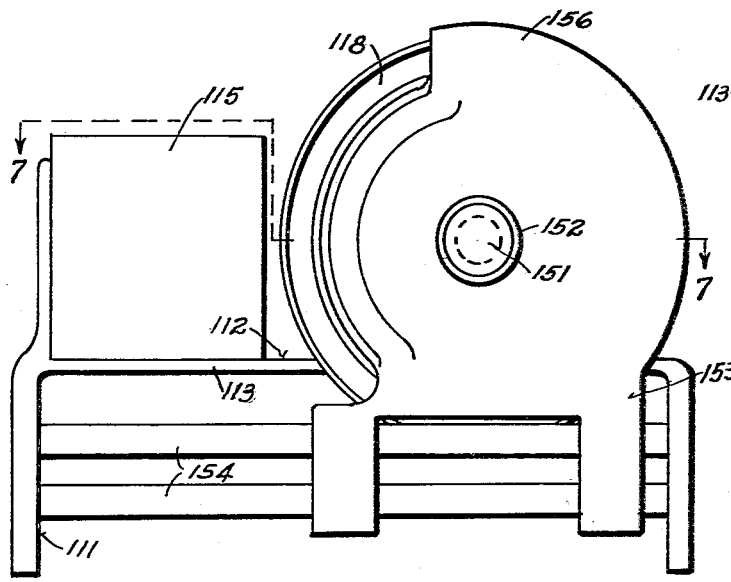
Fig. 5 is an end elevation, partly broken away, showing my invention applied to a rotary cutter.

The cutting machine is exemplified as comprising a suitable frame 11 in which there is a trough 12 formed by a supporting face 13 and a side face 14, forming the supporting and guiding faces for the material to be cut, represented as a brick 15 of cheese.

A cutter-blade 18 is arranged to cut the cheese, to sub-divide the brick into smaller sections, or to cut the same into slices. The blade is secured to a support represented as an arm 19 having a downward extension 20 pivoted on a pivot 21 to the frame. This arrangement causes movement of the blade crosswise of the brick and lengthwise of the blade for imparting a shearing cut.

The cutter-blade has a cutting edge 25. It has a narrow rear face 26 next to the cutting edge which is parallel with the path of the blade and extends lengthwise of the cutting edge and is located in the plane of the path of said cutting edge. Immediately above said narrow rear face the blade has a forwardly receding rear face 27 extending lengthwise of the cutting edge, this forwardly receding rear face being at a very obtuse angle to said narrow rear face and receding upwardly and forwardly from the path of the cutter-blade.

The cutter-blade has a narrow forward face 28 next to its cutting edge extending lengthwise of its cutting edge. This narrow forward face is at an acute angle to the narrow rear face 26, and recedes forwardly away from the path of said narrow rear face. The cutter is further provided with a groove 30 immediately next to the narrow forward face 28, this groove extending rearwardly toward the body from which the slice is being cut, that is, rearwardly toward the path of the narrow rear face 26, this groove extending lengthwise of the cutting edge. The lower wall 31 of the groove is at the upper edge of the narrow forward face 28, and is at an acute angle to said narrow forward face, meeting said latter face to form a sharp corner 32 extending lengthwise of the cutting edge. The upper wall 33 of the groove recedes upwardly and forwardly away from the path of the narrow rear face 26.

The narrow rear face 26 and the narrow forward face 28 and the groove 30 immediately above the latter, with its lower wall 31 receding abruptly from the forward face 28, coact with each other for enabling the cutting edge 25 to cut paths through the brick or body of cheese without endwise displacements of portions of said brick or body, or deviation in thickness of the slices being cut, and enable very thin slices of uniform thickness throughout to be rapidly cut from a brick or body of soft cheese.

The knife is suitably secured to the supporting part or arm 19 of the cutter by screws 34.

The supporting part or arm of the cutter is provided with a ridge 35 extending lengthwise of the cutter. This ridge extends forwardly of the plane forward face 36 of the cutter located above the upper wall 33 of the groove 30, and forms a second groove 37 extending lengthwise of the cutting edge above the ridge. This ridge is useful primarily when cutting cheese or other articles which are hard or stiff, and of which the cut portions of the slices have a tendency to retain their parallelism with the cut face of the brick or body from which they are being cut, the ridge aiding in directing the cut portion of the slice away from said brick or body.

In employing my improved device in cutting slices from a brick of comparatively soft sticky cheese, such as brick cheese, or loaf cheese, including so-called American cream cheese and pimento cheese, the narrow rear face 26 next to the cutting edge only rubs against the body of the brick, the rear face 27 thereabove sloping away from such body for reducing friction and adhesion between said body and the cutter.

The slice 41 being cut is directed away from the body by the narrow forward face 28 next to the cutting edge, for initiating a curling 42 of the cut portion of the slice away from the body of the cutter-blade. The cut portion of the slice in practice has great affinity for the body of the brick and adhesion to the outer face of the cutter, which is counteracted in my improved device by the groove 30, with its lower wall 31 receding abruptly rearwardly from said narrow forward face, thereby forming an air pocket adjacent to the cutting edge extending lengthwise of the cutting edge at said forward face for resisting contact between said cut portion of the slice and such portion of the cutter-blade, freeing the cut portion of the slice from the cutter-blade and permitting such cut portion to slant, bend or recede from the blade in order to clear the blade. The cut slice thereby retains its shape and integrity as a slice and reclines and falls away from the body of the cheese.

There is a tendency in certain kinds of cheese, for instance a hard Swiss cheese, for the cut portion of the slice to maintain its original relation to the body of the cheese, the consistency of such cheese resisting the movement of the cut portion of the slice away from the body of the cheese. The cut portion of the slice of such cheese has a tendency to remain adjacent to the cutter. In cutting cheese of this nature, the ridge 35 acts, as hereinbefore stated, to bend the cut portion of the slice away from the body. The recess formed by the under wall of said ridge forms a relief space between the cut portion of the slice and the cutter, and the groove 37 above the ridge avoids adhesion of the cut portion of the slice to the cutter.

Figure 6:
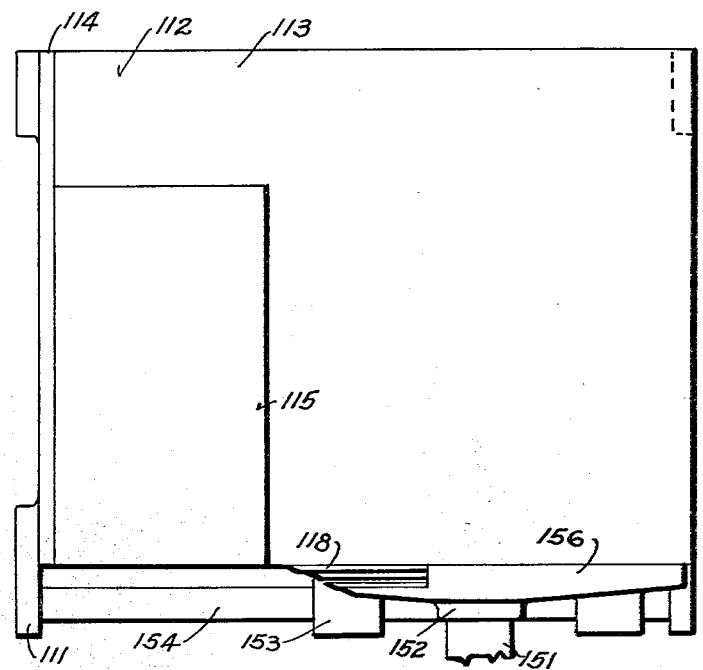
Fig. 6 is a plan view of the same.
Figure 7:
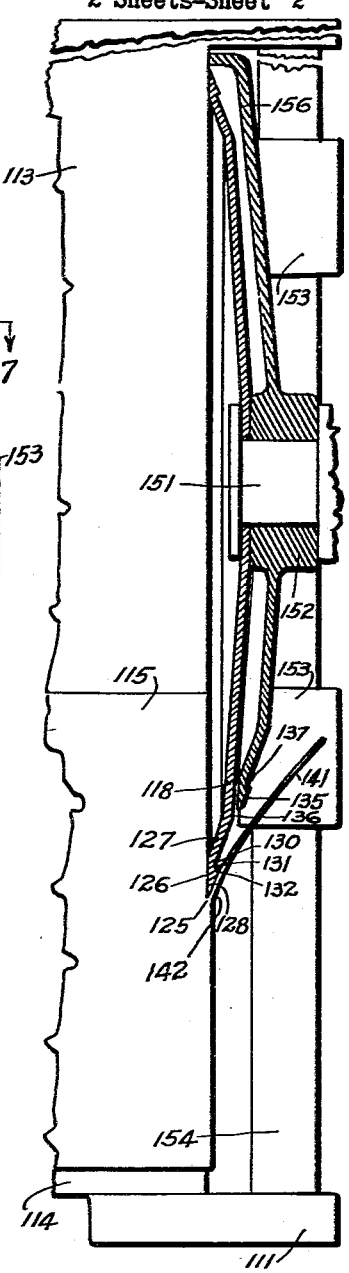
Fig. 7 is a longitudinal section of the same, taken on the irregular line 7—7 of Fig. 5, showing the action of the cutter on a thin slice of sticky cheese being cut from the brick; and, Fig. 8 is an enlarged sectional detail view of the cutter-blade and its support shown in Figs. 1 to 4 inclusive, taken on the line 3—3 of Fig. 1.

I have in Figs. 5, 6 and 7 shown my invention applied in a round knife cutting machine, similar parts being designated by similar reference numerals raised to the series 100. The cutter-blade 118 is shown secured to a shaft 151, journaled in bearings 152, on a suitable slide 153, arranged to be moved back and forth on the frame 111 on guides 154 in suitable manner. The brick or block of cheese 115 or other article is supported in the trough 112 formed by a supoprting face 113 and a side face 114 arranged for guiding the block of material.

In this form of my invention the cutting edge 125 is annular, the narrow rear face 126 next to the cutting edge is annular, and the forwardly receding rear face 127 is formed by the annular dish form of the cutter-blade. The narrow forward face 128 next to the cutting edge is also annular, as is the groove 130 and its lower wall 131 forming the corner 132 at the upper or inner edge of said narrow forward face next to the cutting edge.

My improved device is simple in construction and enables very thin slices to be cut from the body of the material in such manner as to prevent adhesion of the slices to the cutter, and to permit whole well-formed slices of the cross-sectional form of the body of the material to be cut. The guard 156 on the slide 153 is provided with the ridge 135 and the groove 137, the ridge 135 extending forwardly of the plane forward face 136 of the cutter.

Having thus fully described my invention, what I claim as new, and desire to secure by Letters Patent, is:

1. A cutter-blade for a machine of the character described, having a cutting edge having a predetermined path, a narrow rear face extending directly from said cutting edge, said narrow rear face parallel with and lying in the plane of the path of said cutting edge, and a narrow forward face extending directly from said cutting edge at an acute angle to said narrow rear face, said narrow rear face and said narrow forward face meeting to form said cutting edge, and the rear face of said cutter-blade receding from said plane at the edge of said narrow rear face distanced from said cutting edge, and a groove in the forward face of said cutter-blade extending lengthwise of said narrow forward face at the edge of said narrow forward face distanced from said cutting edge, said groove having a wall at said last-named edge closer to said cutting edge than the edge of said narrow rear face distanced from said cutting edge, and said wall receding abruptly rearwardly from said narrow forward face toward said narrow rear face intermediate between the lengthwise edges of said narrow rear face.

2. A cutter-blade for a machine of the character described, having a cutting edge having a predetermined path, a narrow rear face extending directly from said cutting edge, said narrow rear face parallel with and lying in the plane of the path of said cutting edge, and a narrow forward face extending directly from said cutting edge at an acute angle to said narrow rear face, said narrow rear face and said narrow forward face meeting to form said cutting edge, and the rear face of said cutter-blade receding from said plane at the edge of said narrow rear face distanced from said cutting edge, and a groove in the forward face of said cutter-blade extending lengthwise of said narrow forward face at the edge of said narrow forward face distanced from said cutting edge, said groove having a wall at said last-named edge closer to said cutting edge than the edge of said narrow rear face distanced from said cutting edge, said wall receding abruptly rearwardly from said narrow forward face toward said narrow rear face intermediate between the lengthwise edges of said narrow rear face, and a forwardly extending ridge extending lengthwise of said groove distanced farther from said cutting edge than said narrow rear face for forming a second contact edge for the slice being cut, with said groove between said narrow forward face and said ridge forming an intermediate uncontacted space for freedom between said narrow forward face and said ridge for the slice being cut.

3. A cutter-blade for a machine of the character described having a cutting edge, means maintaining said cutting edge in a predetermined path, said cutter-blade having a narrow rear face extending from said cutting edge lengthwise of said cutting edge, said narrow rear face being parallel with and lying in the plane of the path of said cutting edge, and a narrow forward face extending from said cutting edge at an acute angle to said narrow rear face, the rear face of said cutter-blade receding from said plane at the edge of said narrow rear face distanced from said cutting edge, and a groove in the forward face of said cutter-blade extending lengthwise of said narrow forward face at the edge of said narrow forward face distanced from said cutting edge, and the wall of said groove nearest said cutting edge receding abruptly rearwardly from said narrow forward face.

4. A cutter-blade for a machine of the character described, having a cutting edge, means maintaining said cutting edge in a predetermined path, said cutter-blade having a narrow rear face extending from said cutting edge lengthwise of said cutting edge, said narrow rear face being parallel with and lying in the plane of the path of said cutting edge, and a narrow forward face extending from said cutting edge at an acute angle to said narrow rear face, the rear face of said cutter-blade receding from said plane at the edge of said narrow rear face distanced from said cutting edge, and a groove in the forward face of said cutter-blade extending lengthwise of said narrow forward face at the edge of said narrow forward face distanced from said cutting edge, and the wall of said groove nearest said cutting edge receding abruptly rearwardly from said narrow forward face, said last-named wall located nearer to said cutting edge than the edge of said narrow rear face distanced from said cutting edge.

5. A cutter-blade for a machine of the character described, having a cutting edge, means maintaining said cutting edge in a predetermined plane, said cutter-blade having a narrow rear face extending from said cutting edge, said narrow rear face parallel with and lying in said plane, and a narrow forward face extending from said cutting edge at an acute angle to said narrow rear face, said narrow rear face and said narrow forward face meeting to form said cutting edge, the rear face of said cutter-blade receding from said plane at the edge of said narrow rear face distanced from said cutting edge, and a groove in the forward face of said cutter-blade extending lengthwise of said narrow forward face at the edge of said narrow forward face distanced from said cutting edge, said groove having a lower wall at said last-named edge closer to said cutting edge than the edge of said narrow rear face distanced from said cutting edge, and said wall receding abruptly rearwardly from said narrow forward face toward said narrow rear face intermediate between the lengthwise edges of said narrow rear face.

6. A cutter blade for a machine of the character described having a cutting edge, means maintaining said cutting edge in a predetermined path, said cutter blade having a rear face which extends lengthwise of said cutting edge and recedes forwardly from the plane of the path of said cutting edge at an acute angle to said path, said blade further having a narrow forward face extending from said cutting edge lengthwise of said cutting edge at an acute angle to said rear face and at an acute angle to said path, the forward face of said cutter blade provided with a groove extending lengthwise of said narrow forward face at the edge of said narrow forward face distanced from said cutting edge, and the wall of said groove nearest said cutting edge receding abruptly rearwardly from said narrow forward face.

ARTHUR W. MUELLER.